US010020943B2

(12) United States Patent
Wang et al.

(10) Patent No.: US 10,020,943 B2
(45) Date of Patent: Jul. 10, 2018

(54) METHOD AND APPARATUS FOR BINDING DEVICE

(71) Applicant: Xiaomi Inc., Beijing (CN)

(72) Inventors: Yuanbo Wang, Beijing (CN); Enxing Hou, Beijing (CN); Ziguang Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 74 days.

(21) Appl. No.: 15/016,049

(22) Filed: Feb. 4, 2016

(65) Prior Publication Data
US 2016/0241401 A1    Aug. 18, 2016

(30) Foreign Application Priority Data

Feb. 13, 2015 (CN) .......................... 2015 1 0081029

(51) Int. Cl.
H04L 29/06 (2006.01)
H04L 9/32 (2006.01)
H04W 12/06 (2009.01)
H04L 9/14 (2006.01)

(52) U.S. Cl.
CPC .............. *H04L 9/3226* (2013.01); *H04L 9/14* (2013.01); *H04L 9/3236* (2013.01); *H04L 63/083* (2013.01); *H04W 12/06* (2013.01)

(58) Field of Classification Search
CPC ....... H04L 63/083; H04L 9/14; H04L 9/3226; H04L 9/3236; H04W 12/06
See application file for complete search history.

(56) References Cited

U.S. PATENT DOCUMENTS

| 9,128,514 | B2 | 9/2015 | Kumar |
| 2004/0228357 | A1 | 11/2004 | Katsuhisa |
| 2005/0044227 | A1 | 2/2005 | Frances |
| 2008/0034123 | A1* | 2/2008 | Hirao ..................... H04L 41/08 709/253 |
| 2010/0125652 | A1 | 5/2010 | Olli et al. |

(Continued)

FOREIGN PATENT DOCUMENTS

| CN | 101114965 A | 1/2008 |
| CN | 101141279 A | 3/2008 |

(Continued)

OTHER PUBLICATIONS

English translation of International Search Report in corresponding international application No. PCT/CN2015/093273, dated Jan. 25, 2016, 2 pages.

(Continued)

*Primary Examiner* — Joseph P Hirl
*Assistant Examiner* — Chi Nguy

(57) ABSTRACT

Methods and apparatuses are provided for binding a device and a terminal. In the method, the terminal acquires a binding password from a smart home device in a local area network. The terminal transmits a binding request for binding with the smart home device to the server, where the binding request includes a binding password and a user login Identifier (ID). A binding relationship between the user login ID and the smart home device is established by the server when the binding password in the binding request matches with a binding password stored in a server.

17 Claims, 7 Drawing Sheets

(56) References Cited

U.S. PATENT DOCUMENTS

| | | | | |
|---|---|---|---|---|
| 2014/0040435 A1* | 2/2014 | Ylimartimo | ........ | H04L 12/2818 709/219 |
| 2014/0379860 A1* | 12/2014 | Brocker | ................. | H04L 67/10 709/217 |
| 2015/0111539 A1* | 4/2015 | Shim | ................... | H04L 12/2803 455/411 |
| 2015/0200977 A1* | 7/2015 | Wait | ...................... | G06F 3/0482 715/716 |

FOREIGN PATENT DOCUMENTS

| | | |
|---|---|---|
| CN | 102769619 A | 11/2012 |
| CN | 102932785 A | 2/2013 |
| CN | 103166814 A | 6/2013 |
| CN | 103166854 A | 6/2013 |
| CN | 103220313 A | 7/2013 |
| CN | 103248657 A | 8/2013 |
| CN | 104580265 A | 4/2015 |
| JP | 2004310372 A | 11/2004 |
| JP | 2005117194 A | 4/2005 |
| JP | 2011142519 A | 7/2011 |
| JP | 2013130920 A | 7/2013 |
| JP | 2013162314 A | 8/2013 |
| JP | 2014507908 A | 3/2014 |
| JP | 2014199981 A | 10/2014 |
| JP | 2015002543 A | 1/2015 |
| RU | 2251817 C9 | 5/2005 |
| RU | 130098 U1 | 7/2013 |
| WO | 2015132822 A1 | 9/2015 |

OTHER PUBLICATIONS

Written Opinion of the International Search Authority issued in international application number corresponding PCT/CN2015/093273, dated Jan. 25, 2016, 4 pages.

Supplementary European Search Report in European application No. 16152915.1, dated Jul. 1, 2016, 7 pages.

Office Action for Chinese Application No. 201510081029.1 dated Apr. 19, 2017, 7 pages.

First Office Action for Japanese patent application No. 2016-519853 dated Jun. 13, 2017, 4 pages.

Notification of the Decision on Granting a Patent for Invention of Russian application No. 2016118508 with English translation, dated Oct. 11, 2017, 16 pages.

* cited by examiner

METHOD AND APPARATUS FOR BINDING DEVICE

CROSS-REFERENCE TO RELATED APPLICATION

The present disclosure claims priority to Chinese Patent Application with the application number of 201510081029.1, filed Feb. 13, 2015, the entire contents of which are incorporated herein by reference.

TECHNICAL FIELD

The present disclosure relates to the field of communication, and in particular to methods and apparatuses for binding smart home devices with a terminal.

BACKGROUND

With the development of smart devices, constructions of smart homes gradually become a focus in the future. Theoretically, after these devices to be bound access the Internet, they may be accessed and controlled by all devices accessing the Internet due to the reasons that devices to be bound generally have the characteristics of open interactivity and operability. This may lead to potential safety hazards.

In order to specify a private attribute and a user of a device to be bound, one method is to establish a binding relationship between the user and the device to be bound. Once the binding relationship is established, only the bound user has a right over access and control of the device to be bound. Therefore, in the process of establishing the binding relationship between the user and the device to be bound, a higher requirement on security is essentially required.

SUMMARY

According to a first aspect of the present disclosure, a method for binding a device binding method includes: acquiring a binding password from a smart home device in a local area network; transmitting a binding request for binding with the smart home device to the server, wherein the binding request includes a binding password and a user login Identifier (ID), such that the server establishes a binding relationship between the user login ID and the smart home device when the binding password included in the binding request matches with the stored password in a server.

According to a second aspect of the present disclosure, a method for binding a device includes: receiving a binding request from a terminal, wherein the binding request includes a binding password and a user login Identifier (ID), and the binding password is acquired by the terminal from a smart home device in a local area network; matching the binding password with locally stored passwords; and when the binding password matches with any one of the locally stored passwords, establishing a binding relationship between the user login ID and the smart home device corresponding to the any one of the locally stored passwords.

According to a third aspect of the present disclosure, a non-transitory computer-readable storage medium having stored therein instructions that, when executed by a processor of a terminal, causes the terminal to perform a method for binding a device. The method includes: acquiring a binding password from a smart home device in a local area network; transmitting a binding request for binding with the smart home device to the server, where the binding request includes a binding password and a user login Identifier (ID), such that the server establishes a binding relationship between the user login ID and the smart home device when the binding password included in the binding request matches with a stored password in the server.

According to a fourth aspect of the present disclosure, a non-transitory computer-readable storage medium having stored therein instructions that, when executed by a processor of a server, causes the server to perform a method for binding a device, the method including: receiving a binding request from a terminal, wherein the binding request includes a binding password and a user login Identifier (ID), and the binding password is acquired by the terminal from a smart home device in a local area network; matching the binding password with locally stored passwords; and when the binding password matches with any one of the locally stored passwords, establishing a binding relationship between the user login ID and the smart home device corresponding to the any one of the locally stored passwords.

According to a fifth aspect of the present disclosure, an apparatus for binding a device includes: a processor; a memory configured to store executable instructions; wherein the processor is configured to: acquire a binding password from a smart home device in a local area network, wherein the binding password has already been uploaded to a server by the smart home device; and transmit a binding request for binding with the smart home device to the server, wherein the binding request includes a binding password and a user login Identifier (ID), such that the server establishes a binding relationship between the user login ID and the smart home device when the binding password included in the binding request matches with a stored password in the server.

According to a sixth aspect of the present disclosure, an apparatus for binding a device includes: a processor; a memory configured to store executable instructions; wherein the processor is configured to: receive a binding request from a terminal, wherein the binding request includes a binding password and a user login Identifier (ID), and the binding password is acquired by the terminal from a smart home device in a local area network; match the binding password with locally stored passwords; and when the binding password matches with any one of the locally stored passwords, establish a binding relationship between the user login ID and the smart home device corresponding to the any one of the locally stored passwords.

It should be understood that the above general description and following detailed description are intended for schematic and explanatory purposes, and not intended to limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
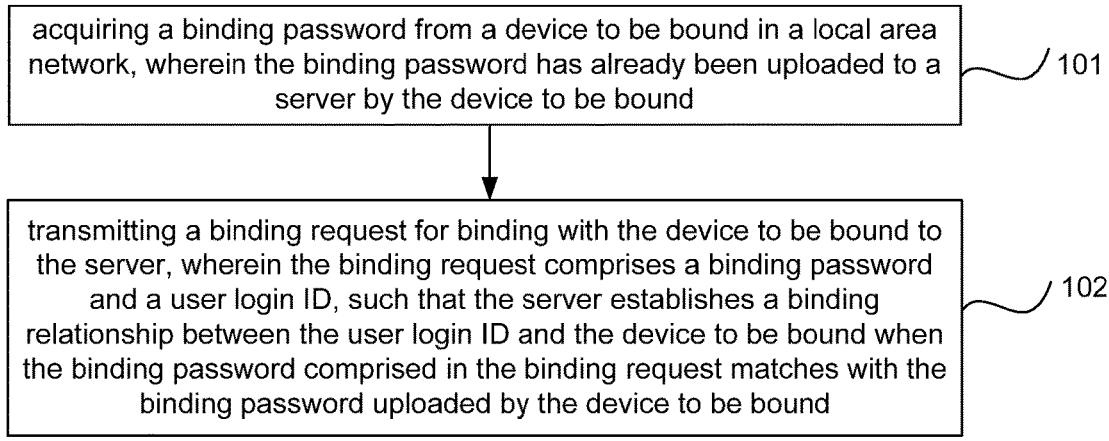
FIG. 1 is a flowchart of a method for binding a device according to one or more embodiments.

The schematic embodiments are described here in detail, and examples are shown in the drawings. Unless specified otherwise, the same numbers in different drawings represent the same or similar elements. Implementations described in the following schematic embodiments do not represent all implementations consistent with the present disclosure. On the contrary, they are only examples of apparatus and methods consistent with some aspects of the present disclosure in the attached claims.

Terms used in the present disclosure are only adopted to describe specific embodiments and not intended limit the present disclosure. "One", "said" and "the" representative of a singular form in the present disclosure and the attached claims are also adopted to indicate most forms unless the context clearly illustrates other meanings. It should also be understood that term "and/or" used in the present disclosure refers to any or all possible combinations including one or more associated listed items.

It should be understood that various information may be described with terms first, second, third and the like in the present disclosure, but these information should not be limited to these terms. These terms are only adopted to distinguish information of the same type. For example, without departing from the scope of the present disclosure, first information may also be called second information. Similarly, second information may also be called first information. Depending on the context, the word "if" used here may be explained as "while" or "when" or "responding to a determination."

When a user desires to get an access and control right over a device to be bound, he/she may install a client software for the device to be bound on a terminal for registration, and then establish a binding relationship between a login account (user login ID) obtained by successful registration and the device to be bound through a corresponding server. After the binding relationship has been established, the user has had an owner right over the device to be bound. After successfully logging in the client software of the device to be bound through the login account, the user may subsequently interact with the device to be bound and perform operations of access, control and the like on the device to be bound through the client software. For example, the device to be bound may be a smart home device. After a binding relationship between the login account of the user and the smart home device is established, the user may control the turning on, turning off, and the like of the smart home device through client software of the smart home device.

In a practical application, since a user generally desires to remotely control the device to be bound, the device to be bound in the local area network usually has access to the Internet. However, a device to be bound generally has the characteristics of open architecture with interactivity and operability, and a server may verify validity of the bound user solely based on a login account during a binding relationship establishment process. Therefore, once the login account of the user is leaked to other users, other users may bind with the device to be bound by virtue of the login account, which may bring severe security risks to the device to be bound.

In view of this, the present disclosure discloses a method for binding a smart home device. A terminal acquires a binding password from a device to be bound in a local area network, and transmits a binding request for binding with the device to be bound to a server, where the binding password has already been uploaded to the server by the device to be bound, and the binding request includes a binding password and a user login ID. When the binding password in the binding request matches with the binding password uploaded by the device to be bound, the server establishes a binding relationship between the user login ID and the device to be bound. Since only the terminal in the local area network may acquire the binding password from the device to be bound and the binding relationship may be established only when the binding password in the binding request transmitted to the server by the terminal matches with the binding password uploaded to the server by the device to be bound, mistaken binding caused by leakage of the user login ID may be avoided, and security of the device may be improved.

FIG. 1 is a method for binding a device according to one or more embodiments, and the device binding method is at least partially implemented in a terminal. As shown in FIG. 1, the method includes the following steps:

Step 101: the terminal acquires a binding password from a device to be bound in a local area network, where the binding password has already been uploaded to a server by the device to be bound. For example, the device to be bound may first connect to a local area network and then sends the binding password to the server.

Step 102: the terminal transmits a binding request for binding with the device to be bound to the server, where the binding request includes a binding password and a user login ID, such that the server establishes a binding relationship between the user login ID and the device to be bound when the binding password in the binding request matches with the binding password uploaded by the device to be bound.

In one or more embodiments, the local area network may be a WIFI (Wireless Fidelity)-based wireless local area network, and the device to be bound may be a smart home device including a built-in WIFI circuitry.

In an initial state, the device to be bound may access the wireless local area network through the built-in WIFI circuitry, and a terminal of a user may also access the wireless local area network. After both the device to be bound and the terminal are successfully connected to the wireless local area network, the device to be bound and the terminal are located in the same local area network, and the user may subsequently initiate an operation of binding with the device to be bound to get an access and control right over the device to be bound by operating client software of the device to be bound installed on the terminal. For example, during implementation, a function switch "initiate binding" may be provided on the client software, and then the user may enable this function switch to initiate the operation of binding with the device to be bound. In one or more embodiments, the function switch "initiate binding" may only be activated when both the device to be bound and the terminal are located in the same local area network.

In order to improve security during the process of establishing a binding relationship between the user and the device to be bound, and solve the problem of mistaken binding, the device to be bound may enable a binding password for establishing binding relationships with all device in the wireless local area network in a binding process. Using the binding password, other devices outside the wireless local area network cannot obtain the binding password, which may avoid mistaken binding caused by the leakage of the user login ID. For example, the router in the wireless local area network may prevent the connected devices to access other devices outside the wireless local area network.

During implementation, in order to ensure that a device not belonging to the local area network can get the binding password, the device to be bound may enable transmission service for the wireless local area network. The transmission service may allow the device to be bound to communicate with the wireless local area network. After the transmission service is enabled, the client software may transmit a querying request of querying about the binding password to the device to be bound using the transmission service. In addition, the device to be bound may receive the querying request transmitted by the device in the wireless local area network using the transmission service. In this way, any device with a requirement of binding with the device to be bound in the wireless local area network may successfully acquire the binding password.

In one or more embodiments, the device to be bound may upload the binding password to the server in advance through an encryption channel, and the server may locally store the binding password uploaded by the device to be bound in advance and locally store a corresponding relationship between the binding password and the ID of the device to be bound (for example, a hardware address of the device to be bound) for subsequent query.

Further, for a terminal that acquires the binding password successfully, the user may transmit the binding request to the server through the client software of the device to be bound installed on the terminal, and the binding request may include the binding password and the login account of the user. After receiving the binding request, the server may verify the binding password in the binding request, and the binding relationship may be established only after the binding password passes verification.

Moreover, for security purpose, when the device to be bound locally enables the binding password, it may also encrypt the binding password to generate a key through a pre-set encryption algorithm. In this way, when the device to be bound uploads the binding password to the server, or when the terminal transmits the binding request to the server after acquiring the encrypted binding password from the device to be bound, security of the binding password in an uploading or transmission process can be ensured. After the server receives the encrypted binding password, uploaded by the device to be bound, it may decrypt the binding password through a pre-set decryption algorithm, and store the decrypted binding password.

In one or more embodiments, there are no limits on the pre-set encryption algorithm and decryption algorithm. For example, during implementation, the device to be bound may interact with the server to negotiate about the algorithms, or the algorithms may be specified by the server and notified to the device to be bound.

In one or more embodiments, the transmission service for the wireless local area network may be UDP service, and the solutions of the present disclosure are described below by using UDP service as an example.

In an initial state, after the device to be bound successfully accesses the wireless local area network, a UDP port for the wireless local area network may be opened in background by a default setting, where a port number of the UDP port is not limited in the disclosure. For example, the port number may be any port number that is not a well-known port number, which includes a dynamic port number or a private port number.

Meanwhile, the port number of the UDP port may also be configured in the client software of the device to be bound in advance. When the user initiates binding password querying to the device to be bound by operating the client software, the client software may transmit the querying request to the UDP port according to the UDP port number which is configured in advance. When the UDP port number is not configured in the client software in advance, the device to be bound may further transmit a broadcast message in the wireless local area network to notify the port number of the enabled UDP port to all the client software receiving the broadcast message in the wireless local area network after the UDP port is enabled.

In one or more embodiments, when the device to be bound receives the querying request transmitted by the client software in the wireless local area network, it may monitor the UDP port in real time after the UDP port is enabled. Once the UDP port receives the querying request transmitted by the client software in the wireless local area network, the UDP port may immediately respond to the client software with a message to transmit the preset encrypted binding password to the client software.

After the client software successfully obtains the binding password, the user may operate the client software to transmit the binding request to the server, the binding request may include the binding password and the login account of the user, and if there are multiple devices to be bound within the wireless local area network, the binding request may further include IDs of the devices to be bound for distinction.

After the server receives the binding request, it may verify the login account in the binding request at first. The decrypted binding passwords uploaded by the devices to be bound have been locally stored in the server. The server may further acquire the binding password in the binding request, decrypt the binding password in the binding request according to the pre-set decryption algorithm and then match the decrypted binding password and the locally stored binding passwords uploaded by the devices to be bound one by one. When the binding password in the binding request matches with any locally stored binding password, the binding password passes verification.

After the binding password passes verification, the server may further query about whether a binding relationship has been locally established between the ID of the device to be bound in the binding request and another user. If no binding relationship has been locally established, the server may locally establish the binding relationship between the login account in the binding request and the ID of the device to be bound directly. After the binding relationship is successfully established, the server may further transmit a binding success notification message to the device to be bound, and the user may remotely access and control the device to be bound through the successfully bound login account subsequently.

It should be appreciated that, other than the UDP service, other implementations may also be adopted for the transmission service of the wireless local area network. For example, the transmission service may also be Hyper Text Transfer Protocol (HTTP) service. When the transmission service is HTTP service, a private Internet Protocol (IP) address for the wireless local area network may be enabled. Based on the private IP address, the user may perform HTTP-based communication with the device to be bound through the client software on the terminal, and transmit the querying request to the device to be bound, and those processes will not be described in detail In one or more embodiments.

In one or more embodiments, the terminal acquires the binding password from the device to be bound in the local area network, and transmits the binding request for binding with the device to be bound to the server, where the binding password has already been uploaded to the server by the device to be bound, and the binding request includes the binding password and the user login ID. When the binding password in the binding request matches with the binding password uploaded by the device to be bound, the server establishes the binding relationship between the user login ID and the device to be bound. Since only the terminal in the local area network may acquire the binding password from the device to be bound and the binding relationship may be established only when the binding password in the binding request transmitted to the server by the terminal matches with the binding password uploaded to the server by the device to be bound, mistaken binding caused by leakage of the user login ID may be avoided, and security of the device may be improved.

Figure 2:
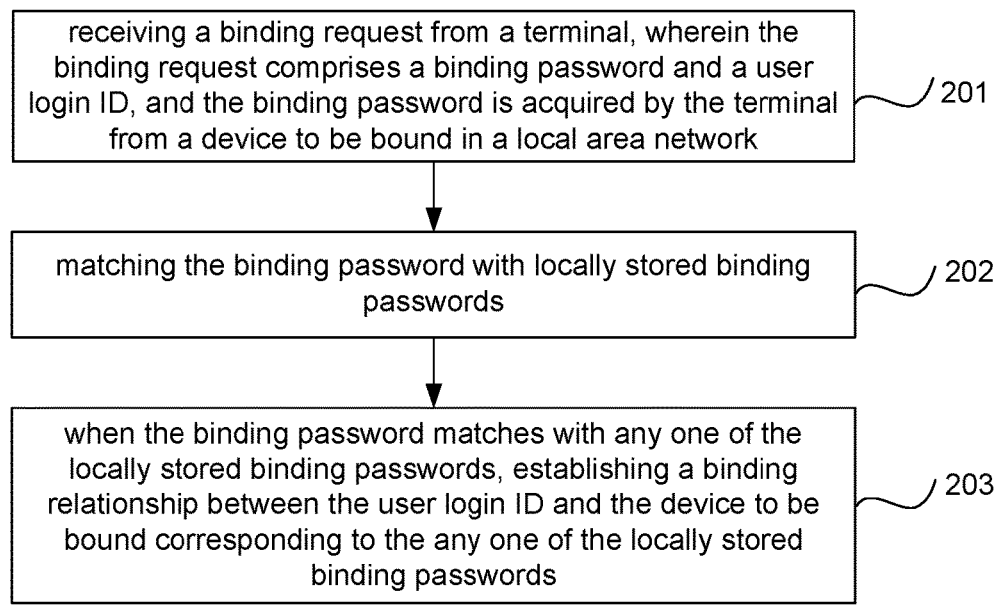
FIG. 2 is a flowchart of another method for binding a device according to one or more embodiments.

FIG. 2 is a method for binding a device according to one or more embodiments, and the method is at least partially implemented in a server. As shown in FIG. 2, the method includes the following steps:

Step 201: the server receives a binding request from a terminal, where the binding request includes a binding password and a user login ID. The binding password is acquired by the terminal from a device to be bound in a local area network.

Step 202: the server matches the binding password with locally stored binding passwords.

Step 203: when the binding password matches with any one of the locally stored binding passwords, the server establishes a binding relationship between the user login ID and the device to be bound corresponding to the any one of the locally stored binding passwords.

In one or more embodiments, the local area network may be a WI FI-based wireless local area network, and the device to be bound may be a smart home device with a built-in WIFI circuitry.

In an initial state, the device to be bound may access the wireless local area network through the built-in WIFI circuitry, and a terminal of a user may also access the wireless local area network. After both the device to be bound and the terminal successfully access the wireless local area network, the device to be bound and the terminal are located in the same local area network, and the user may subsequently initiate an operation of binding with the device to be bound to get an access and control right over the device to be bound by operating client software of the device to be bound installed on the terminal. For example, during implementation, a function switch "initiate binding" may be provided on the client software, and then the user may enable this function switch to initiate the operation of binding with the device to be bound.

During binding with the device to be bound through the client software, the user generally transmits a binding request including a login account of the user and an ID of the device to be bound to the server through the client software. When the device to be bound has not established a binding relationship with another user after the login account passes identity authentication of the server, a binding relationship between the login account and the device to be bound may be locally established directly. Since the server performs identity authentication on the basis of the login account of the user during establishment of a binding relationship, once the login account is leaked, the login account may be utilized by another illegal user for successful binding with the device to be bound, which may lead to security risks.

During implementation, in order to ensure that a device not belonging to the local area network can get the binding password, the device to be bound may enable transmission service for the wireless local area network. After the transmission service is enabled, the client software may transmit a querying request of querying about the binding password to the device to be bound on the basis of the transmission service. In addition, the device to be bound may receive the querying request transmitted by the device in the wireless local area network on the basis of the transmission service. In this way, any device with a requirement of binding with the device to be bound in the wireless local area network may successfully acquire the binding password.

In one or more embodiments, the device to be bound may upload the binding password to the server in advance through an encryption channel, and the server may locally store the binding password uploaded by the device to be bound in advance and locally store a corresponding relationship between the binding password and the ID of the device to be bound (for example, a hardware address of the device to be bound) for subsequent query.

Further, for a terminal that acquires the binding password successfully, the user may transmit the binding request to the server through the client software of the device to be bound installed on the terminal, and the binding request may include the binding password and the login account of the user. After receiving the binding request, the server may verify the binding password in the binding request, and the binding relationship may be established only after the binding password passes verification.

Moreover, for security purpose, when the device to be bound locally enables the binding password, it may also encrypt the binding password to generate a key through a pre-set encryption algorithm. In this way, when the device to be bound uploads the binding password to the server, or when the terminal transmits the binding request to the server after acquiring the encrypted binding password from the device to be bound, security of the binding password in an uploading or transmission process can be maximally ensured. After the server receives the encrypted binding password uploaded by the device to be bound, it may decrypt the binding password through a pre-set decryption algorithm, and store the decrypted binding password.

In one or more embodiments, there are no limits on the pre-set encryption algorithm and decryption algorithm In one or more embodiments. For example, during implementation, the device to be bound may interact with the server to negotiate about the algorithms, or the algorithms may be specified by the server, and then are notified to the device to be bound.

In one or more embodiments, the transmission service for the wireless local area network may be UDP service, and the technical solutions of the present disclosure are described below by taking an assumption that the transmission service is UDP service as an example.

In an initial state, after the device to be bound successfully accesses the wireless local area network, a UDP port for the wireless local area network may be opened in background as a default, wherein a port number of the UDP port is not limited in the disclosure. For example, the port number may be a dynamic port number or private network port number in UDP port numbers.

Meanwhile, the port number of the UDP port number may also be configured in the client software of the device to be bound in advance. When the user initiates binding password querying to the device to be bound by operating the client software, the client software may transmit the querying request to the UDP port according to the UDP port number which is configured in advance. Of course, if the UDP port number is not configured in the client software in advance, the device to be bound may further transmit a broadcast message in the wireless local area network to notify the port number of the enabled UDP port to all the client software receiving the broadcast message in the wireless local area network after the UDP port is enabled.

In one or more embodiments, when the device to be bound receives the querying request transmitted by the client software in the wireless local area network, it may monitor the UDP port in real time after the UDP port is enabled. Once the UDP port receives the querying request transmitted by the client software in the wireless local area network, the UDP port may immediately respond to the client software with a message to transmit the encrypted binding password which is set in advance to the client software.

After the client software successfully obtains the binding password, the user may operate the client software to transmit the binding request to the server, the binding request may include the binding password and the login account of the user, and if there are multiple pieces of devices to be bound within the wireless local area network, the binding request may further include IDs of the device to be bound for distinction.

After the server receives the binding request, it may verify the login account in the binding request at first. The decrypted binding passwords uploaded by the devices to be bound have been locally stored in the server. The server may further acquire the binding password in the binding request, decrypt the binding password in the binding request according to the pre-set decryption algorithm and then match the decrypted binding password and the locally stored binding passwords uploaded by the devices to be bound one by one. When the binding password in the binding request matches with any locally stored binding password, the binding password passes verification.

After the binding password passes verification, the server may further query about whether a binding relationship has been locally established between the ID of the device to be bound in the binding request and another user. If NO, the server may locally establish the binding relationship between the login account in the binding request and the ID of the device to be bound directly. After the binding relationship is successfully established, the server may further transmit a binding success notification message to the device to be bound, and the user may remotely access and control the device to be bound through the successfully bound login account subsequently.

It should be appreciated that, other than the UDP service, other implementations may also be adopted for the transmission service of the wireless local area network. For example, the transmission service may also be HTTP service. When the transmission service is HTTP service, a private IP address for the wireless local area network may be enabled. Based on the private IP address, the user may perform HTTP-based communication with the device to be bound through the client software on the terminal, and transmit the querying request to the device to be bound, and those processes will not be described in detail one by one In one or more embodiments.

In one or more embodiments, the terminal acquires the binding password from the device to be bound in the local area network, and transmits the binding request for binding with the device to be bound to the server, wherein the binding password has already been uploaded to the server by the device to be bound, and the binding request includes the binding password and the user login ID. When the binding password in the binding request matches with the binding password uploaded by the device to be bound, the server establishes the binding relationship between the user login ID and the device to be bound. Since only the terminal in the local area network may acquire the binding password from the device to be bound and the binding relationship may be established only when the binding password in the binding request transmitted to the server by the terminal matches with the binding password uploaded to the server by the device to be bound, mistaken binding caused by leakage of the user login ID may be avoided, and security of the device may be improved.

Figure 3:
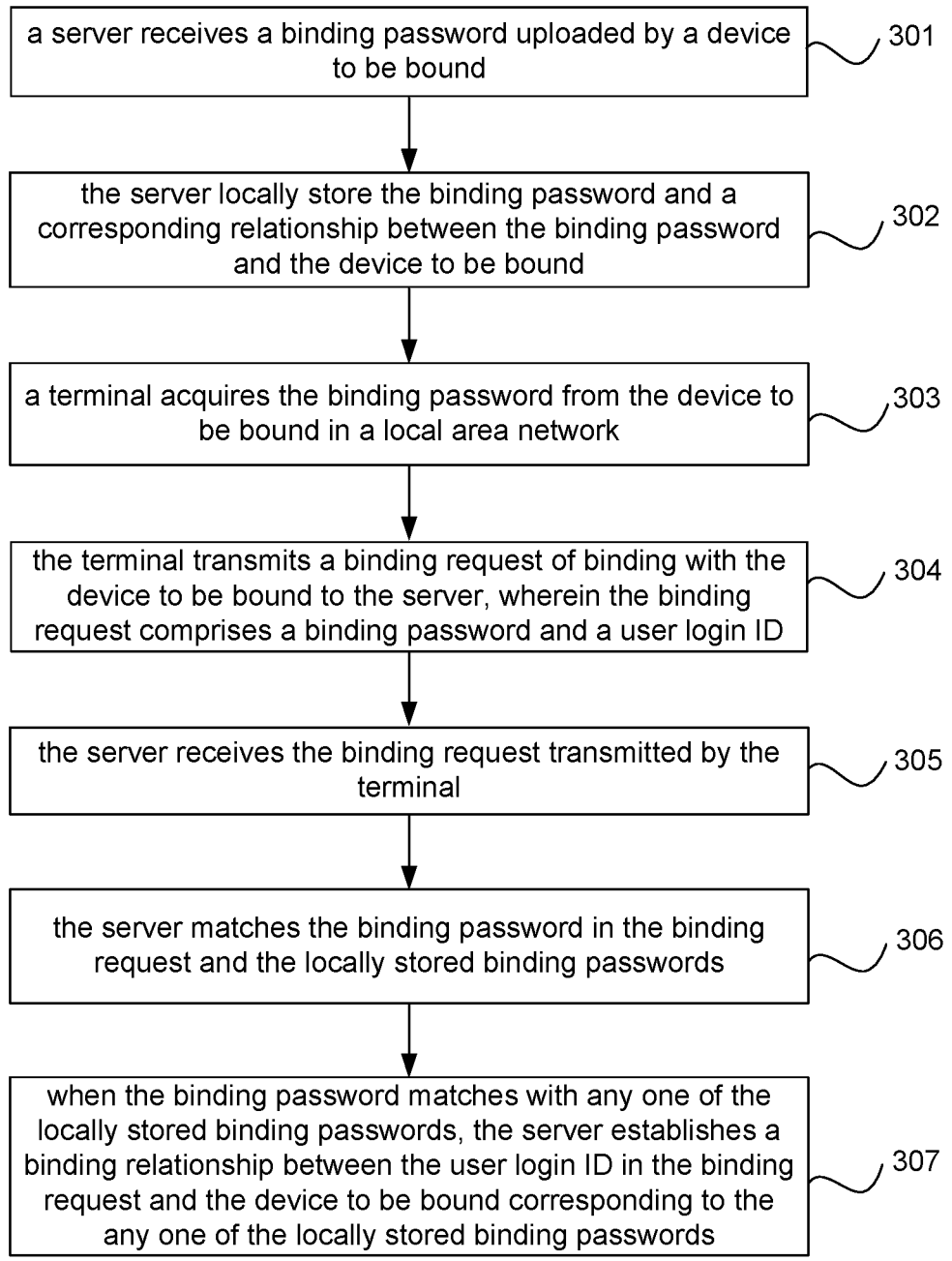
FIG. 3 is a flowchart of a third method for binding a device according to one or more embodiments.

FIG. 3 is a method for binding a device according to one or more embodiments. As shown in FIG. 3, the method includes the following steps:

Step 301: a server receives a binding password uploaded by a device to be bound;

Step 302: the server locally store the binding password and a corresponding relationship between the binding password and the device to be bound;

Step 303: a terminal acquires the binding password from the device to be bound in a local area network;

Step 304: the terminal transmits a binding request of binding with the device to be bound to the server, wherein the binding request includes a binding password and a user login ID;

Step 305: the server receives the binding request transmitted by the terminal;

Step 306: the server matches the binding password in the binding request and the locally stored binding passwords; and Step 307: when the binding password matches with any one of the locally stored binding passwords, the server establishes a binding relationship between the user login ID in the binding request and the device to be bound corresponding to the any one of the locally stored binding passwords.

In one or more embodiments, the local area network may be a WI FI-based wireless local area network, and the device to be bound may be device to be bound with a built-in WIFI circuitry, for example, smart home device with a built-in WIFI circuitry. The terminal may be an intelligent portable terminal, for example, an intelligent mobile phone; and the server may be a server, a server cluster or a cloud platform.

In an initial state, the device to be bound may access the wireless local area network through the built-in WIFI circuitry, and a terminal of a user may also access the wireless local area network. After both the device to be bound and the terminal successfully access the wireless local area network, the device to be bound and the terminal are located in the same local area network, and the user may subsequently initiate an operation of binding with the device to be bound to get an access and control right over the device to be bound by operating client software of the device to be bound installed on the terminal. For example, during implementation, a function switch "initiate binding" may be provided on the client software, and then the user may enable this function switch to initiate the operation of binding with the device to be bound.

In one or more embodiments, in order to improve security during the process of establishing a binding relationship between the user and the device to be bound, and solve the problem of mistaken binding, the device to be bound may enable a binding password for establishing binding relationships with all device in the wireless local area network in a binding process, and it is impossible for other devices outside the wireless local area network to obtain the binding password, which may avoid mistaken binding caused by the leakage of the user login ID.

During implementation, in order to ensure that a device which not belonging to the local area network can get the binding password, the device to be bound may enable transmission service for the wireless local area network. After the transmission service is enabled, the client software may transmit a querying request of querying about the binding password to the device to be bound on the basis of the transmission service. In addition, the device to be bound may receive the querying request transmitted by the device in the wireless local area network on the basis of the transmission service. In this way, any device with a requirement of binding with the device to be bound in the wireless local area network may successfully acquire the binding password.

In one or more embodiments, the device to be bound may upload the binding password to the server in advance through an encryption channel, and the server may locally store the binding password uploaded by the device to be bound in advance and locally store a corresponding relationship between the binding password and the ID of the device to be bound (for example, a hardware address of the device to be bound) for subsequent query.

Further, for a terminal that acquires the binding password successfully, the user may transmit the binding request to the server through the client software of the device to be bound installed on the terminal, and the binding request may include the binding password and the login account of the user. After receiving the binding request, the server may verify the binding password in the binding request, and the binding relationship may be established only after the binding password passes verification.

Moreover, for security purpose, when the device to be bound locally enables the binding password, it may also encrypt the binding password to generate a key through a pre-set encryption algorithm. In this way, when the device to be bound uploads the binding password to the server, or when the terminal transmits the binding request to the server after acquiring the encrypted binding password from the device to be bound, security of the binding password in an uploading or transmission process can be maximally ensured. After the server receives the encrypted binding password, uploaded by the device to be bound, it may decrypt the binding password through a pre-set decryption algorithm, and store the decrypted binding password.

In one or more embodiments, there are no special limits on the pre-set encryption algorithm and decryption algorithm. For example, during implementation, the device to be bound may interact with the server to negotiate about the algorithms, or the algorithms may be specified by the server and notified to the device to be bound.

In one or more embodiments, the transmission service for the wireless local area network may be UDP service, and the technical solutions of the present disclosure are described below by taking an assumption that the transmission service is UDP service as an example.

In an initial state, after the device to be bound successfully accesses the wireless local area network, a UDP port for the wireless local area network may be opened in background as a default, wherein a port number of the UDP port is not limited in the disclosure. For example, the port number may be a dynamic port number or private network port number in UDP port numbers.

Meanwhile, the port number of the UDP port number may also be configured in the client software of the device to be bound in advance. When the user initiates binding password querying to the device to be bound by operating the client software, the client software may transmit the querying request to the UDP port according to the UDP port number which is configured in advance. Of course, if the UDP port number is not configured in the client software in advance, the device to be bound may further transmit a broadcast message in the wireless local area network to notify the port number of the enabled UDP port to all the client software receiving the broadcast message in the wireless local area network after the UDP port is enabled.

In one or more embodiments, when the device to be bound receives the querying request transmitted by the client software in the wireless local area network, it may monitor the UDP port in real time after the UDP port is enabled. Once the UDP port receives the querying request transmitted by the client software in the wireless local area network, the UDP port may immediately respond to the client software with a message to transmit the encrypted binding password which is set in advance to the client software.

After the client software successfully obtains the binding password, the user may operate the client software to transmit the binding request to the server, the binding request may include the binding password and the login account of the user, and if there are multiple pieces of device to be bound within the wireless local area network, the binding request may further include IDs of the device to be bound for distinction. After successfully obtaining the binding password, if the current user terminal is still connected to the wireless local area network, the client software may transmit the binding request to the server on the basis of the local area network. If the current user terminal leaves the coverage of the local area network, the binding request may also be transmitted to the server on the basis of another network (for example, a mobile network of a communication operator) to finish remote binding.

After the server receives the binding request, it may verify the login account in the binding request at first. The decrypted binding passwords uploaded by the devices to be bound have been locally stored in the server. The server may further acquire the binding password in the binding request, decrypt the binding password in the binding request according to the pre-set decryption algorithm and then match the decrypted binding password and the locally stored binding passwords uploaded by the devices to be bound one by one. When the binding password in the binding request matches with any locally stored binding password, the binding password passes verification.

After the binding password passes verification, the server may further query about whether a binding relationship has been locally established between the ID of the device to be bound in the binding request and another user. If No, the server may locally establish the binding relationship between the login account in the binding request and the ID of the device to be bound directly. After the binding relationship is successfully established, the server may further transmit a binding success notification message to the device to be bound, and the user may remotely access and control the device to be bound through the successfully bound login account subsequently.

It should be appreciated that, other than the UDP service, other implementations may also be adopted for the transmission service of the wireless local area network. For example, the transmission service may also be Hyper Text Transfer Protocol (HTTP) service. When the transmission service is HTTP service, a private Internet Protocol (IP) address for the wireless local area network may be enabled. Based on the private IP address, the user may perform HTTP-based communication with the device to be bound through the client software on the terminal, and transmit the querying request to the device to be bound.

However, after the smart device is successfully bound with the login account of the user, the user may generally have a requirement of remote access and control over the smart device. When the user remotely accesses and controls the smart device outside the coverage of the wireless local area network, an access message of the user may reach the smart device only after a router of the wireless local area network performs Network Address Translation (NAT) on an IP address of the access message. Therefore, there is a problem of NAT traversal in a process of remotely accessing and controlling the smart device.

Presently, the most popular and effective manner for NAT traversal is to configure the UDP port number for NAT traversal. If the user performs the transmission service with the smart device through the port number of the UDP port enabled by the smart device, the access message may be transmitted to the smart device after directly traversing a NAT firewall of the router of the wireless local area network for IP address translation. Those skilled in the art may refer to introductions about an implementation method of configuring the UDP port number for NAT traversal in an existing technology, and detailed description will not be given In one or more embodiments.

The access device wirelessly and directly traverses the NAT firewall of the router of the wireless local area network for IP address translation if the user performs the transmission service with the smart device through the HTTP service enabled by the smart device, and under such a condition, it is necessary to set a polling mechanism for the smart device to periodically transmit an access message request to the server, and by such a manner, there may be a certain delay when the user remotely accesses the smart device. Therefore, there will be a great advantage if the transmission service of the smart device for the wireless local area network is UDP service. The description made above by taking an assumption that the transmission service for the wireless local area network is UDP service, but the present disclosure it not limited to this.

In one or more embodiments, the terminal acquires the binding password from the device to be bound in the local area network, and transmits the binding request of binding with the device to be bound to the server, wherein the binding password has already been uploaded to the server by the device to be bound, and the binding request includes the binding password and the user login ID. When the binding password in the binding request matches with the binding password uploaded by the device to be bound, the server establishes the binding relationship between the user login ID and the device to be bound. Since only the terminal in the local area network may acquire the binding password from the device to be bound and the binding relationship may be established only when the binding password in the binding request transmitted to the server by the terminal matches with the binding password uploaded to the server by the device to be bound, mistaken binding caused by leakage of the user login ID may be avoided, and security of the device may be improved.

The present disclosure further provides apparatus embodiments corresponding to the abovementioned device binding method embodiments.

Figure 4:
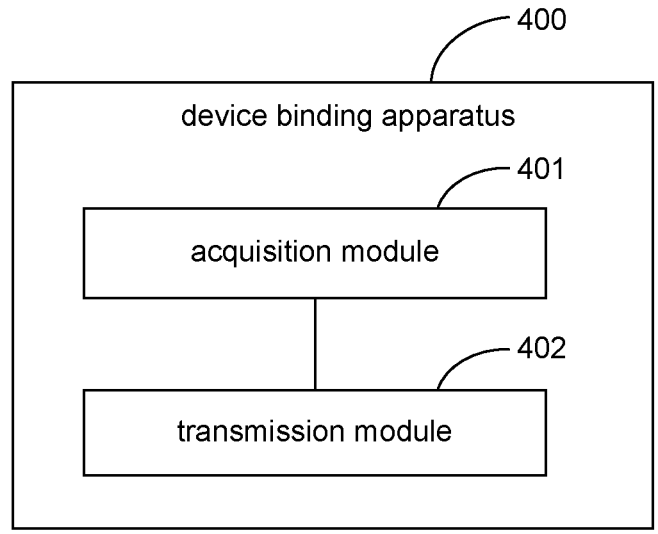
FIG. 4 is a schematic diagram of an apparatus for binding a device according to one or more embodiments.

FIG. 4 is a schematic diagram of an apparatus for binding a device according to one or more embodiments.

As shown in FIG. 4, a device binding apparatus 400 according to one or more embodiments includes: an acquisition module 401 and a transmission module 402, wherein the acquisition module 401 is configured to acquire a binding password from a device to be bound in a local area network, wherein the binding password has already been uploaded to a server by the device to be bound; and the transmission module 402 is configured to transmit a binding request for binding with the device to be bound to the server, wherein the binding request includes a binding password and a user login Identifier (ID), such that the server establishes a binding relationship between the user login ID and the device to be bound when the binding password included in the binding request matches with the binding password uploaded by the device to be bound.

In one or more embodiments, a terminal acquires the binding password from the device to be bound in the local area network, and transmits the binding request of binding with the device to be bound to the server, wherein the binding password has already been uploaded to the server by the device to be bound, and the binding request includes the binding password and the user login ID. When the binding password in the binding request matches with the binding password uploaded by the device to be bound, the server establishes the binding relationship between the user login ID and the device to be bound. Since only the terminal in the local area network may acquire the binding password from the device to be bound and the binding relationship may be established only when the binding password in the binding request sent to the server by the terminal is matched with the binding password uploaded to the server by the device to be bound, mistaken binding caused by leakage of the user login ID may be avoided, and security of the device may be improved.

Figure 5:
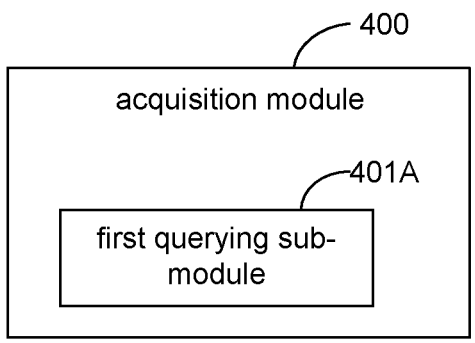
FIG. 5 is a schematic diagram of another apparatus for binding a device according to one or more embodiments.

FIG. 5 is a diagram of another apparatus according to one or more embodiments, and as shown in FIG. 5, the embodiment is based on the embodiment shown in FIG. 4, and when transmission service for the local area network includes UDP service, the acquisition module 401 may include a first querying sub-module 401A.

the first querying sub-module 401A is configured to query the device to be bound about the binding password on the basis of a port number of a local pre-set UDP port opened by the UDP server.

Figure 6:
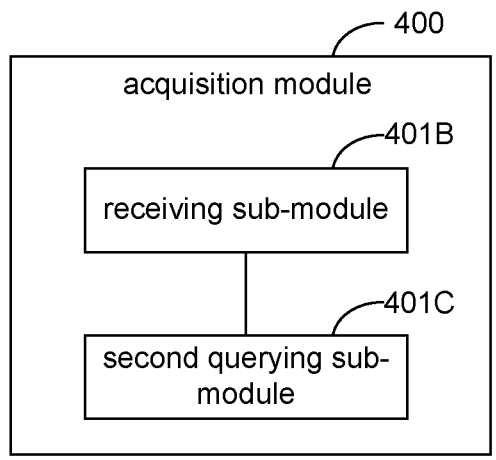
FIG. 6 is a schematic diagram of another apparatus for binding a device according to one or more embodiments.

FIG. 6 is a diagram of another apparatus according to one or more embodiments, and as shown in FIG. 6, the embodiment is based on the embodiment shown in FIG. 4, and when the transmission service for the local area network includes UDP service, the acquisition module 401 may further include a receiving sub-module 401B and a second querying sub-module 401C.

the receiving sub-module 401B is configured to receive the port number of the UDP port opened by the UDP server, which is broadcast in the local area network by the device to be bound; and the second querying sub-module 401C is configured to query the device to be bound about the binding password on the basis of the received port number. For example, the sub-module 401C may send a query to the smart home device at the received port number.

It should be appreciated that the structures of the receiving sub-module 401B and the second querying sub-module 401C in the apparatus embodiment shown in FIG. 6 may further be included in the apparatus embodiment shown in FIG. 5, which is not limited in the present disclosure.

Figure 7:
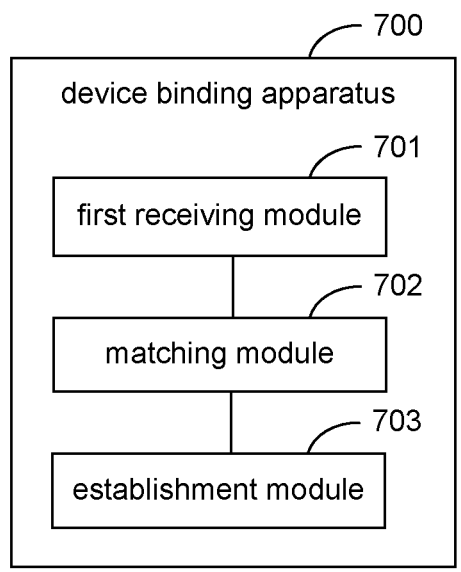
FIG. 7 is a schematic diagram of another apparatus for binding a device according to one or more embodiments.

FIG. 7 is a schematic diagram of an apparatus for binding a device according to one or more embodiments.

As shown in FIG. 7, a device binding apparatus 700 according to one or more embodiments includes: a first receiving module 701, a matching module 702 and an establishment module 703.

the first receiving module 701 is configured to receive a binding request from a terminal, wherein the binding request includes a binding password and a user login ID, and the binding password is acquired by the terminal from a device to be bound in a local area network;

the matching module 702 is configured to match the binding password with locally stored binding passwords; and the establishment module 703 is configured to, when the binding password matches with any one of the locally stored binding passwords, establish a binding relationship between the user login ID and the device to be bound corresponding to the any one of the locally stored binding passwords.

In one or more embodiments, the terminal acquires the binding password from the device to be bound in the local area network, and transmits the binding request of binding with the device to be bound to the server, wherein the binding password has already been uploaded to the server by the device to be bound, and the binding request includes the binding password and the user login ID. When the binding password in the binding request matches with the binding password uploaded by the device to be bound, the server establishes the binding relationship between the user login ID and the device to be bound. Since only the terminal in the local area network may acquire the binding password from the device to be bound and the binding relationship may be established only when the binding password in the binding request transmitted to the server by the terminal matches with the binding password uploaded to the server by the device to be bound, mistaken binding caused by leakage of the user login ID may be avoided, and security of the device may be improved.

Figure 8:
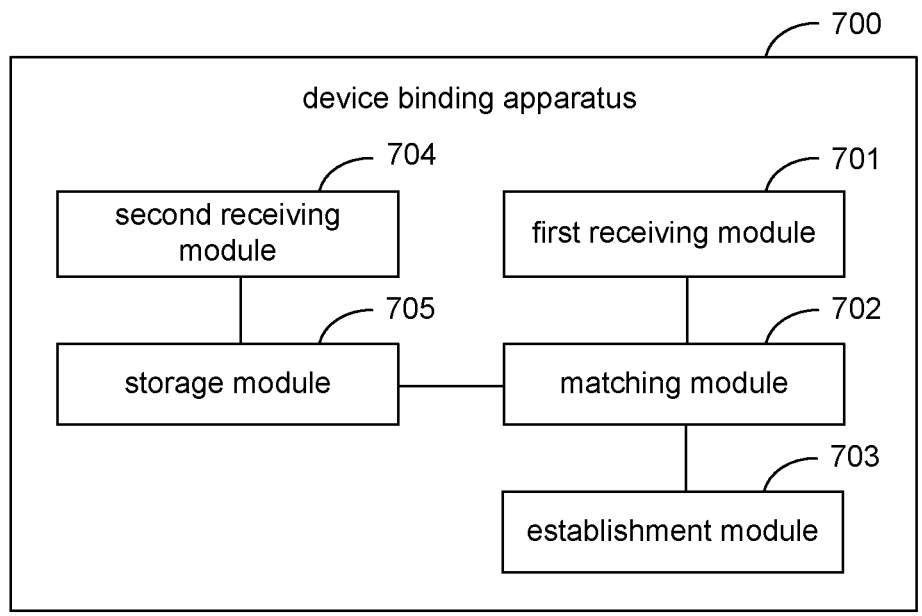
FIG. 8 is a schematic diagram of another apparatus for binding a device according to one or more embodiments.

FIG. 8 is a diagram of another apparatus according to one or more embodiments, and as shown in FIG. 8, the embodiment is based on the embodiment shown in FIG. 7, and the apparatus 700 may further include a second receiving module 704 and a storage module 705.

the second receiving module 704 is configured to, before the matching module matches the binding password with the locally stored binding passwords, receive the binding password uploaded by the device to be bound; and the storage module 705 is configured to locally store the binding password uploaded by the device to be bound and a corresponding relationship between the binding password and the device to be bound.

Figure 9:
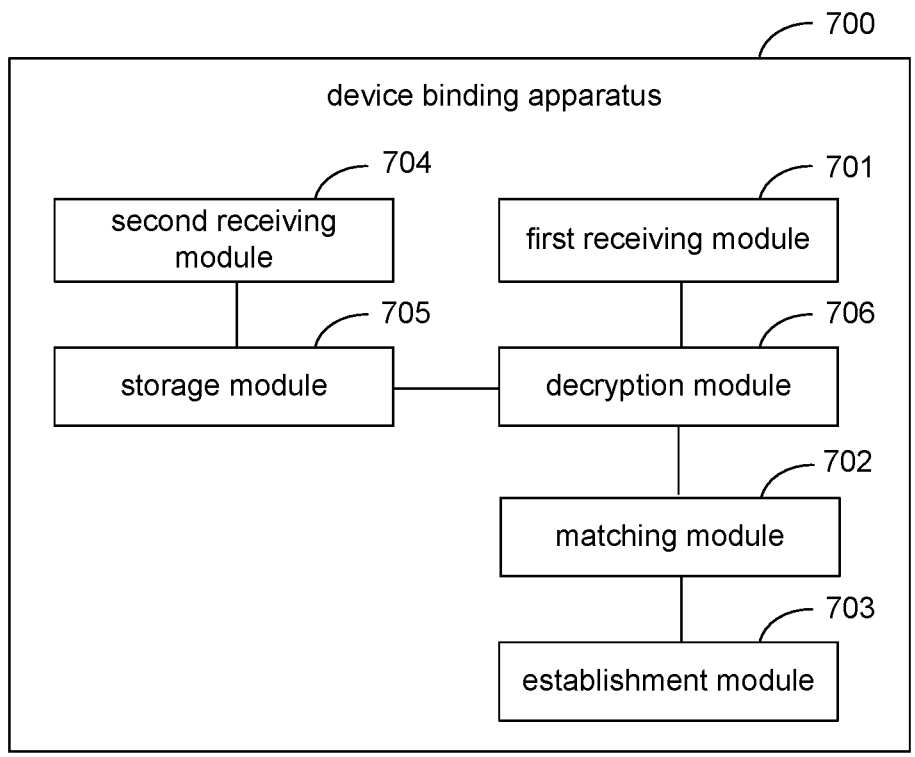
FIG. 9 is a schematic diagram of another apparatus for binding a device according to one or more embodiments.

FIG. 9 is a diagram of another apparatus according to one or more embodiments, and as shown in FIG. 9, the embodiment is based on the embodiment shown in FIG. 7, and when the binding password has been encrypted by the device to be bound according to a pre-set encryption algorithm, the apparatus 700 may further include a decryption module 706, wherein the decryption module 706 is configured to decrypt the binding password uploaded by the device to be bound and the binding password in the binding request according to a pre-set decryption algorithm.

It should be appreciated that the structure of the decryption module 706 in the apparatus embodiment shown in FIG. 9 may further be included in the apparatus embodiment shown in FIG. 8, which is not limited in the present disclosure.

Figure 10:
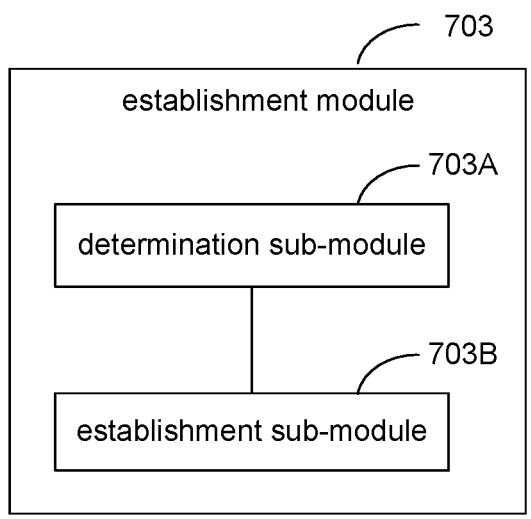
FIG. 10 is a schematic diagram of another apparatus for binding a device according to one or more embodiments.

FIG. 10 is a diagram of another apparatus according to one or more embodiments, and as shown in FIG. 10, the embodiment is based on the embodiment shown in FIG. 7, and the determination module 703 may further include a determination sub-module 703A and an establishment sub-module 703B.

the determination sub-module 703A is configured to determine a binding relationship has been established for the device to be bound corresponding to the any one of the locally stored binding passwords; and the establishment sub-module 703B is configured to, when a binding relationship for the device to be bound corresponding to the any one of the locally stored binding passwords has not been established, establish the binding relationship between the user login ID and the device to be bound.

It should be appreciated that the structures of the determination sub-module 703A and the establishment sub-module 703B in the apparatus embodiment shown in FIG. 10 may further be included in the apparatus embodiments shown in FIG. 8-9, which is not limited in the present disclosure.

Functions of each module in the apparatus and implementation processes of the functions refer to the implementation processes of the corresponding steps in the methods, and will not be repeated here.

For apparatus embodiments, since they substantially correspond to the method embodiments, description about related parts refer to description about the corresponding parts of the method embodiments. The apparatus embodiments described above are only schematic, wherein the modules described as separate parts may be or may not be physically separated, and the parts displayed as modules may be or may not be physical modules, that is, the parts may be located at the same place, or may also be distributed on multiple network modules. A part or all of the modules may be selected to fulfil the aim of the solutions of the present disclosure according to a practical requirement.

Figure 11:
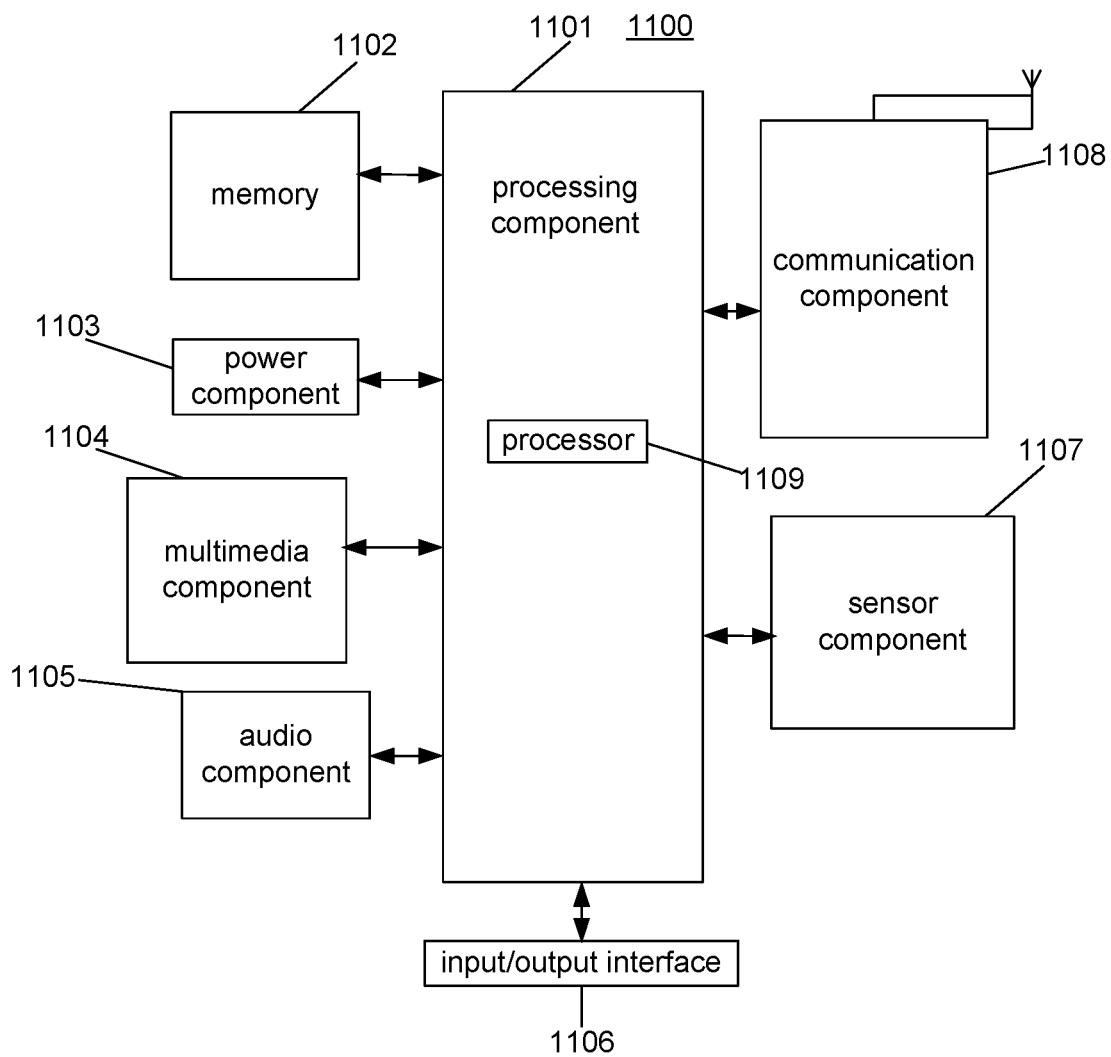
FIG. 11 is a structure diagram of a device binding apparatus according to one or more embodiments.

FIG. 11 is a structure diagram of an apparatus for binding a device according to one or more embodiments.

As shown in FIG. 11, a device binding apparatus 1100 according to one or more embodiments may be a mobile phone, a computer, a digital broadcasting terminal, a message transceiver device, a game console, a tablet device, a medical device, a fitness device, a personal digital assistant or the like.

As shown in FIG. 11, the apparatus 1100 may include one or more of the following components: a processing component 1101, a memory 1102, a power component 1103, a multimedia component 1104, an audio component 1105, an Input/Output (I/O) interface 1106, a sensor component 1107 and a communication component 1108.

The processing component 1101 typically controls overall operations of the apparatus 1100, such as operations associated with display, telephone calls, data communications, camera operations and recording operations. The processing component 1101 may include one or more processors 1109 to execute instructions to perform all or a part of the above described methods. Moreover, the processing component 1101 may include one or more modules which facilitate the interaction between the processing component 1101 and other components. For example, the processing component 1101 may include a multimedia module to facilitate interaction between the multimedia component 1104 and the processing component 1101.

The memory 1102 is configured to store various types of data to support operations in the apparatus 1100. Examples of such data includes instructions for any applications or method operated in the apparatus 1100, contact data, phonebook data, messages, pictures, videos or the like. The memory 1102 may be implemented by any type of volatile or non-volatile memory device, or a combination thereof, such as a Static Random Access Memory (SRAM), an Electrically Erasable Programmable Read-Only Memory (EEPROM), an Electrically Programmable Read-Only Memory (EPROM), a Programmable Read-Only Memory (PROM), a Read-Only Memory (ROM), a magnetic memory, a flash memory, a magnetic or optical disc.

The power component 1103 supplies power for each component of the apparatus 1100. The power component 1103 may include a power management system, one or more power sources, and any other components associated with the generation, management and distribution of power in the apparatus 1100.

The multimedia component 1104 includes a screen providing an output interface between the apparatus 1100 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors for sensing touches, swipes and gestures on the touch panel. The touch sensors may not only sense a boundary of a touch or swipe action, but also sense a period of time and a pressure associated with the touch or swipe action. In some embodiments, the multimedia component 1104 includes a front camera and/or a rear camera. The front camera and/or the rear camera may receive an external multimedia datum while the apparatus 1100 is in an operating mode, for example, a photographing mode or a video mode. Each of the front camera and the rear camera may be a fixed optical lens system or have focus and optical zoom capability.

The audio component 1105 is configured to output and/or input audio signals. For example, the audio component 1105 includes a Microphone (MIC) configured to receive an external audio signal when the apparatus 1100 is in an operating mode, such as a call mode, a recording mode and a voice recognition mode. The received audio signal may further be stored in the memory 1102 or transmitted via the communication component 1108. In some embodiments, the audio component 1105 further includes a loudspeaker for outputting audio signals.

The I/O interface 1106 provides an interface between the processing component 1101 and peripheral interface modules, such as a keyboard, a click wheel, buttons, and the like. The buttons may include, but are not limited to, a home button, a volume button, a starting button, and a locking button.

The sensor component 1107 includes one or more sensors to provide state assessments of various aspects of the apparatus 1100. For instance, the sensor component 1107 may detect an open/closed status of the apparatus 1100 and relative positioning of components, for example, the display and keyboard, of the apparatus 1100, and the sensor component 1107 may further detect a change in position of the apparatus 1100 or a component of the apparatus 1100, a presence or absence of user contact between the user and the apparatus 1100, an orientation or acceleration/deceleration of the apparatus 1100 and a change in temperature of the apparatus 1100. The sensor component 1107 may include a proximity sensor, configured to detect the presence of nearby objects without any physical contact. The sensor component 1107 may further include a light sensor, for example, a Complementary Metal-Oxide-Semiconductor (CMOS) or Charge-Coupled Device (CCD) image sensor, for use in imaging applications. In some embodiments, the sensor component 1107 may further include an acceleration sensor, a gyroscope sensor, a magnetic sensor, a pressure sensor or a temperature sensor.

The communication component 1108 is configured to facilitate communication, wired or wirelessly, between the apparatus 1100 and other device. The apparatus 1100 may access a wireless network based on a communication standard, such as WiFi, 2G, or 3G, or a combination thereof. In one exemplary embodiment, the communication component 1108 receives a broadcast signal or broadcast associated information from an external broadcast management system via a broadcast channel. In one exemplary embodiment, the communication component 1108 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1102, executable by the processor 1109 in the apparatus 1100, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by a processor of a mobile terminal, the mobile terminal may execute a method for binding a device, the method includes:

acquiring a binding password from a device to be bound in a local area network, wherein the binding password has already been uploaded to a server by the device to be bound;

transmitting a binding request for binding with the device to be bound to the server, wherein the binding request includes a binding password and a user login Identifier (ID), such that the server establishes a binding relationship between the user login ID and the device to be bound when the binding password included in the binding request matches with the binding password uploaded by the device to be bound.

The present disclosure further provides a device binding apparatus, which includes: a processor; a memory configured to store executable instructions. The processor is configured to: receive a binding request from a terminal, wherein the binding request includes a binding password and a user login Identifier (ID), and the binding password is acquired by the terminal from a device to be bound in a local area network; match the binding password with locally stored binding passwords; and when the binding password matches with any one of the locally stored binding passwords, establish a binding relationship between the user login ID and the device to be bound corresponding to the any one of the locally stored binding passwords.

Figure 12:
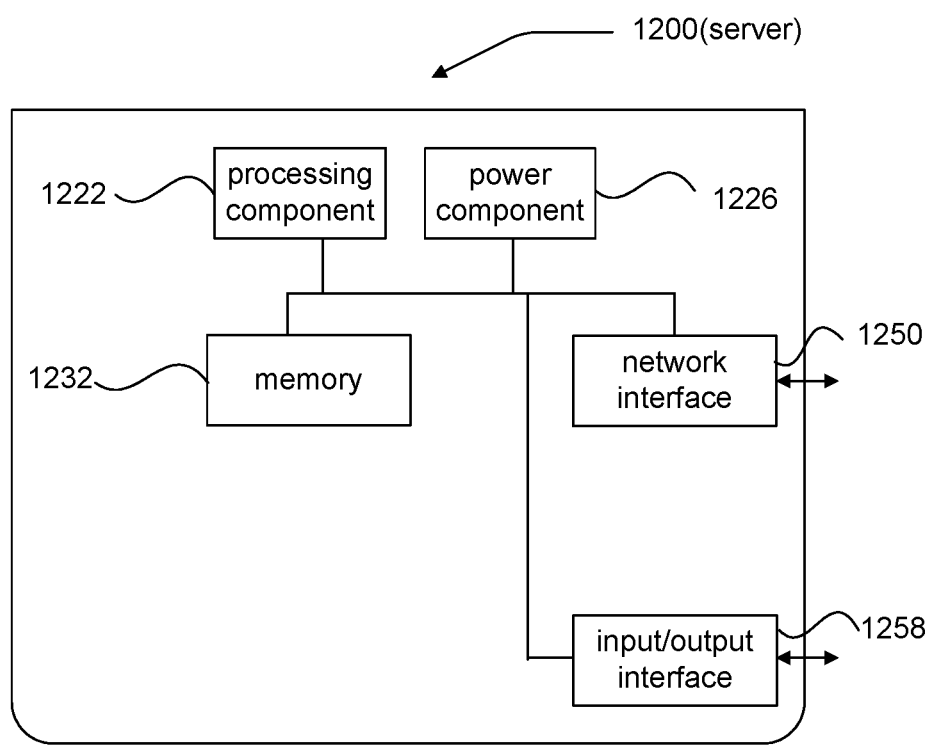
FIG. 12 is a structure diagram of another apparatus for binding a device according to one or more embodiments.

FIG. 12 is a diagram of a device binding apparatus 1200 according to one or more embodiments. For example, the apparatus 1200 may be provided as a server. As shown in FIG. 12, the apparatus 1200 includes a processor 1222 including one or more processors, and storage resources represented by a memory 1232. The memory 1232 is configured to store instructions, for example, application programs, executable by the processor 1222. The application programs stored in the memory 1232 may include one or more instruction modules, each of which corresponds to a group of instructions. In addition, the processor 1222 is configured to execute the instructions to perform the above-mentioned device binding method.

The apparatus 1200 may further include a power component 1226 configured to execute power management of the apparatus 1200, a wired or wireless network interface 1250 configured to connect the apparatus 1200 to a network, and an I/O interface 1258. The apparatus 1200 may operate an operating system stored in the memory 1232, for example, Windows Server™, Mac OS X™, Unix™, Linux™, FreeBSD™ or the like. Each module or sub-module may take the form of a packaged functional hardware unit designed for use with other components, a portion of a program code (e.g., software or firmware) executable by the processor 1109, the processing component 1222, or the processing circuitry that usually performs a particular function of related functions, or a self-contained hardware or software component that interfaces with a larger system, for example.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method, comprising:
acquiring, by a terminal, a binding password from a smart home device in a local area network using a User Datagram Protocol (UDP) service;
transmitting, by the terminal, a binding request for binding with the smart home device to a server, wherein the binding request comprises the binding password and a user login Identifier (ID), such that the server establishes a binding relationship between the user login ID and the smart home device when the binding password in the binding request matches with a stored password in a server, wherein the stored password in the server is received from the smart home device via an encryption channel in advance, and the binding password is encrypted by the smart home device and is acquired by the terminal and is uploaded to the server before the binding password is decrypted and is compared with the stored password;
wherein acquiring the binding password from the smart home device in the local area network using the UDP service comprises:
identifying a port number of a local pre-set UDP port opened by a UDP server, and querying the smart home device about the binding password using the port number.

2. The method according to claim 1, wherein acquiring the binding password from the smart home device in the local area network comprises: receiving the port number of the UDP port opened by the UDP server, wherein the port number is broadcasted in the local area network by the smart home device; and querying the smart home device about the binding password using the received port number.

3. The method according to claim 1, wherein the binding password is encrypted by the smart home device according to a pre-set encryption algorithm.

4. The method according to claim 1, wherein the server receives the stored password uploaded by the smart home device; and
wherein the server locally stores the stored password and a corresponding relationship between the binding password and the smart home device.

5. The method according to claim 4, wherein the binding password is encrypted by the device to be bound according to a pre-set encryption algorithm, the method further comprising:
decrypting the binding password from the smart home device and the binding password in the binding request according to a pre-set decryption algorithm.

6. The method according to claim 1, wherein the server establishes the binding relationship between the user login ID and the smart home device by performing acts comprising:
determining whether a binding relationship has been established for the stored passwords; and
when a binding relationship for the smart home device corresponding to the stored passwords has not been established, establishing the binding relationship between the user login ID and the smart home device.

7. A non-transitory computer-readable storage medium having stored therein instructions that, when executed by a processor of a terminal, causes the terminal to perform acts comprising:
acquiring a binding password from a smart home device in a local area network using a User Datagram Protocol (UDP) service;
transmitting a binding request for binding with the smart home device to a server, wherein the binding request comprises a binding password and a user login Identifier (ID), such that the server establishes a binding relationship between the user login ID and the smart home device when the binding password in the binding request matches with a stored password in the server, wherein the stored password in the server is received from the smart home device via an encryption channel in advance, and the binding password is encrypted by the smart home device and is acquired by the terminal and is uploaded to the server before the binding password is decrypted and is compared with the stored password;

wherein acquiring the binding password from the smart home device in the local area network using the UDP service comprises:

identifying a port number of a local pre-set UDP port opened by a UDP server, and querying the smart home device about the binding password using the port number.

8. The non-transitory computer-readable storage medium according to claim 7, wherein acquiring the binding password from the smart home device in the local area network comprises:

receiving the port number of the UDP port opened by the UDP server, wherein the port number is broadcasted in the local area network by the smart home device, and querying the smart home device about the binding password using the received port number.

9. The non-transitory computer-readable storage medium according to claim 8, wherein the server receives the stored password uploaded by the smart home device; and wherein the server locally stores the stored password and a corresponding relationship between the binding password and the smart home device.

10. The non-transitory computer-readable storage medium according to claim 9, wherein the binding password is encrypted by the device to be bound according to a pre-set encryption algorithm, the acts further comprising:

decrypting the binding password from the smart home device and the binding password in the binding request according to a pre-set decryption algorithm.

11. The non-transitory computer-readable storage medium according to claim 7, wherein the binding password has been encrypted by the smart home device according to a pre-set encryption algorithm.

12. The non-transitory computer-readable storage medium according to claim 7, wherein the server establishes the binding relationship between the user login ID and the smart home device by performing acts comprising:

determining whether a binding relationship has been established for the stored passwords; and when a binding relationship for the smart home device corresponding to the stored passwords has not been established, establishing the binding relationship between the user login ID and the smart home device.

13. A non-transitory computer-readable storage medium having stored therein instructions that, when executed by a processor of a server, causes the server to perform acts comprising:

receiving a binding request from a terminal, wherein the binding request comprises a binding password and a user login Identifier (ID), and the binding password is acquired by the terminal from a smart home device in a local area network using a User Datagram Protocol (UDP) service;

matching the binding password with locally stored passwords, wherein the stored password in the server is received from the smart home device via an encryption channel in advance, and the binding password is encrypted by the smart home device and is acquired by the terminal and is uploaded to the server before the binding password is decrypted and is compared with the stored password; and when the binding password matches with one of the locally stored passwords, establishing a binding relationship between the user login ID and the smart home device corresponding to the one of the locally stored passwords;

wherein the binding password is acquired by the terminal from a smart home device in a local area network using the UDP service comprises:

identifying a port number of a local pre-set UDP port opened by a UDP server, and querying the smart home device about the binding password using the port number.

14. The non-transitory computer-readable storage medium according to claim 13, before the step of matching the binding password with locally stored passwords, the acts further comprising:

receiving the binding password uploaded by the smart home device; and locally storing the binding password uploaded by the smart home device and a corresponding relationship between the binding password and the smart home device.

15. The non-transitory computer-readable storage medium according to claim 14, when the binding password has been encrypted by the smart home device according to a pre-set encryption algorithm, the acts further comprising:

decrypting the binding password uploaded by the smart home device and the binding password in the binding request according to a pre-set decryption algorithm.

16. The non-transitory computer-readable storage medium according to claim 13, wherein the step of establishing a binding relationship between the user login ID and the smart home device corresponding to the one of the locally stored passwords comprises:

determining whether a binding relationship has been established for the one of the locally stored passwords; and when a binding relationship for the smart home device corresponding to the one of the locally stored passwords has not been established, establishing the binding relationship between the user login ID and the smart home device.

17. The non-transitory computer-readable storage medium according to claim 16, wherein acquiring the binding password from the smart home device in the local area network comprises:

receiving the port number of the UDP port opened by the UDP server, wherein the port number is broadcasted in the local area network by the smart home device, and querying the smart home device about the binding password using the received port number.

* * * * *